Figure 1:
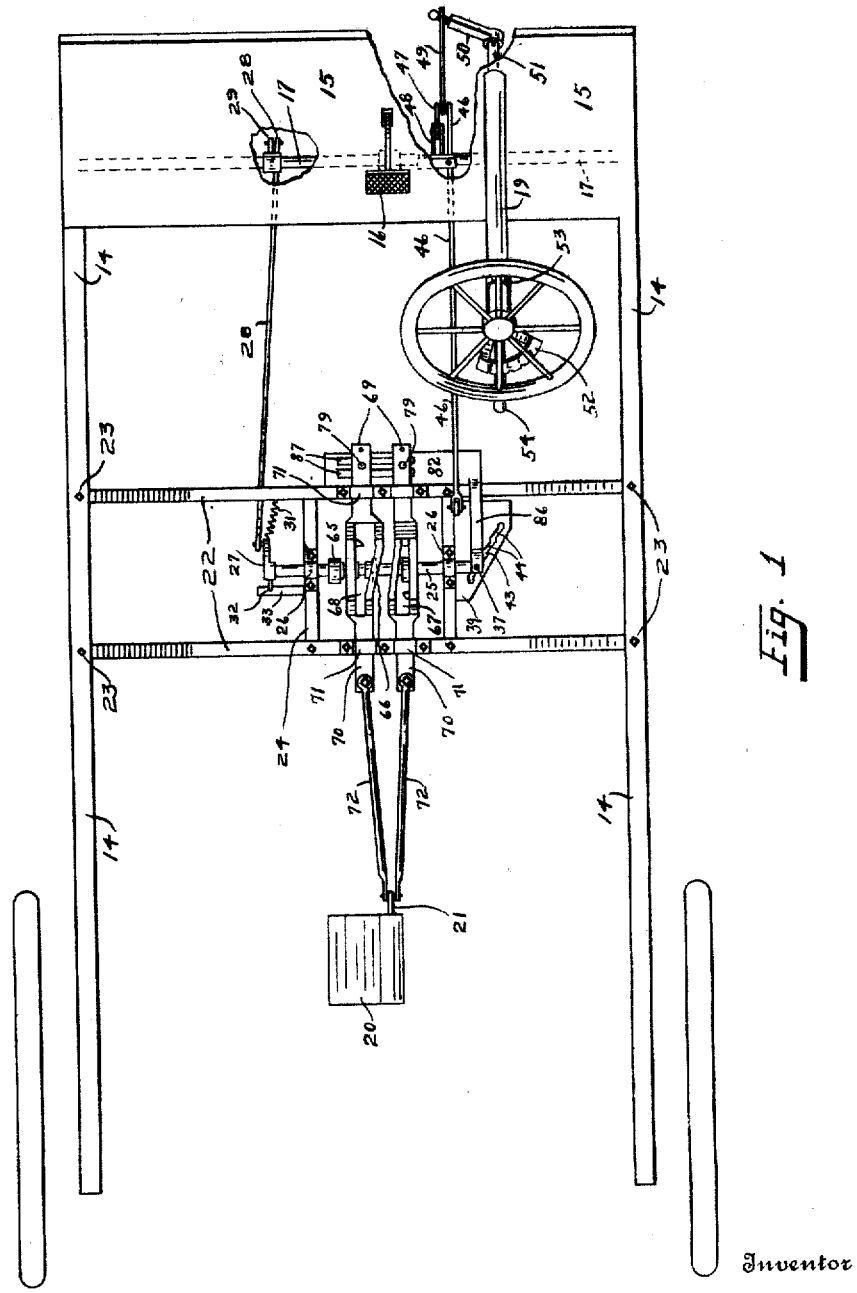

B. A. WALRATH.
GEAR SHIFTING MECHANISM.
APPLICATION FILED MAR. 13, 1914.

1,239,435.

Patented Sept. 4, 1917.
4 SHEETS—SHEET 1.

Witnesses
R. W. McDonald
[signature]

Inventor
B. A. WALRATH
By Milton S. Crandall
Attorney

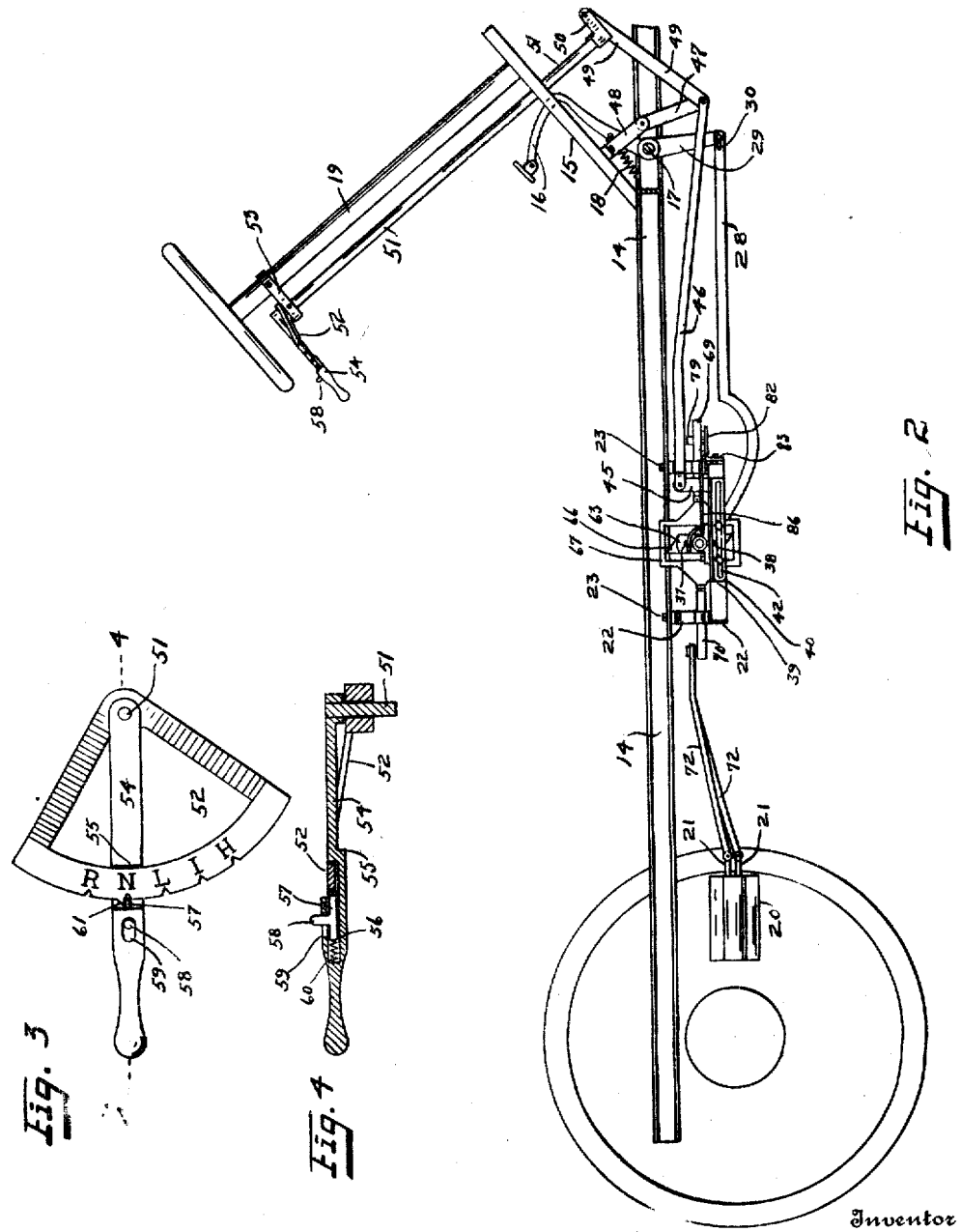

B. A. WALRATH.
GEAR SHIFTING MECHANISM.
APPLICATION FILED MAR. 13, 1914.
1,239,435.
Patented Sept. 4, 1917.
4 SHEETS—SHEET 3.
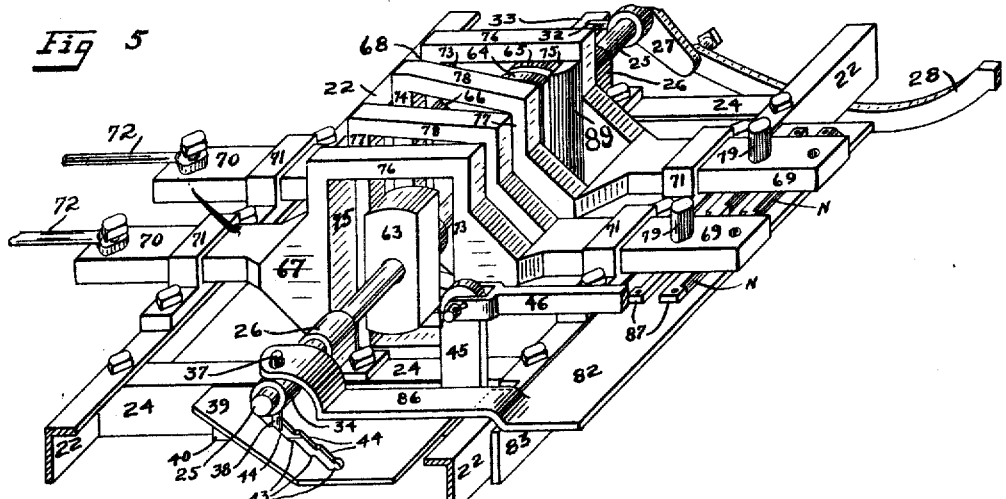
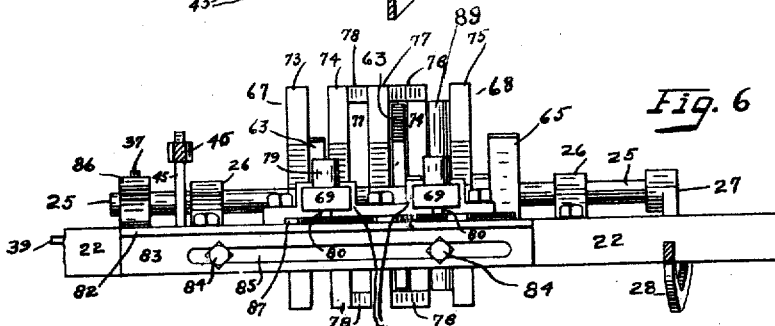
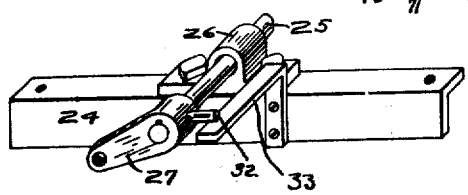
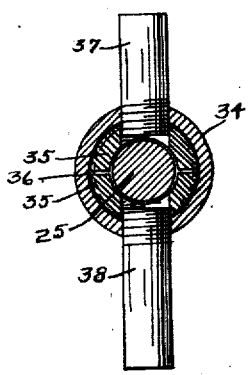
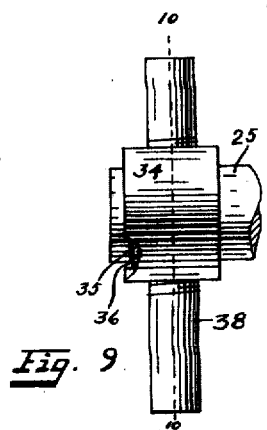
Witnesses
Inventor
B. A. WALRATH
By Milton S. Crandall
Attorney

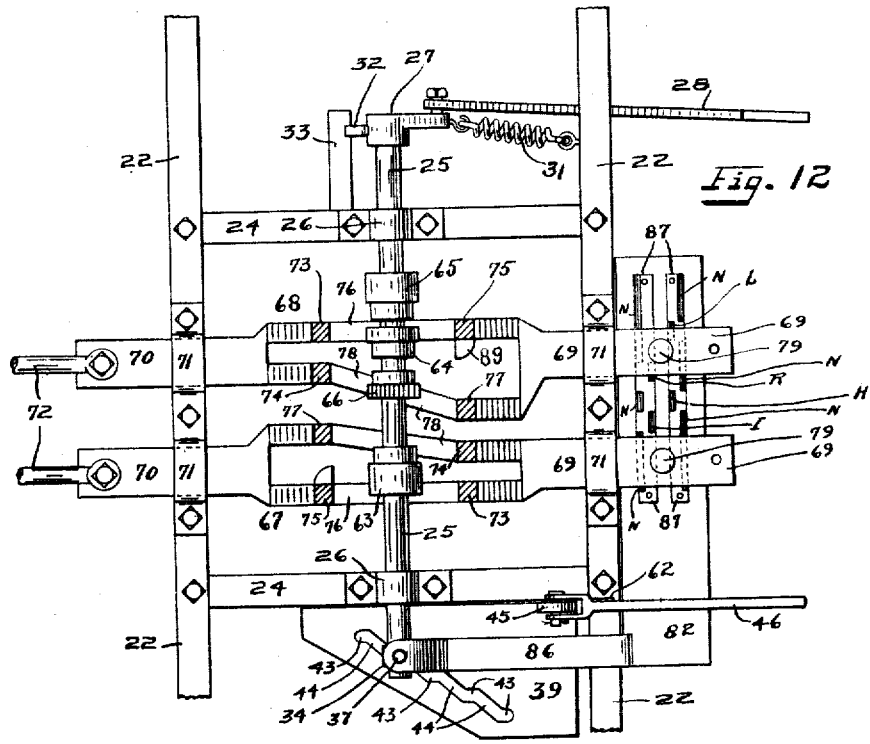
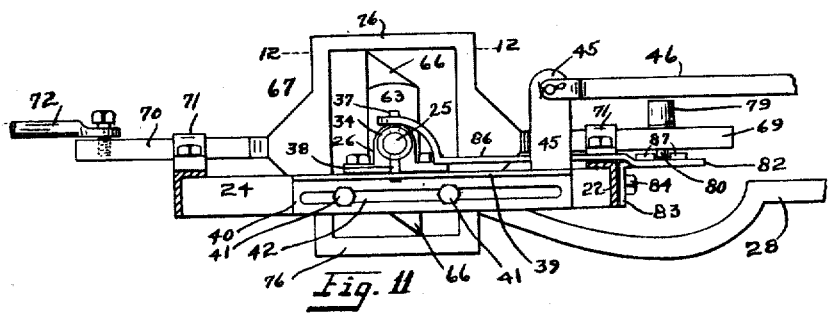
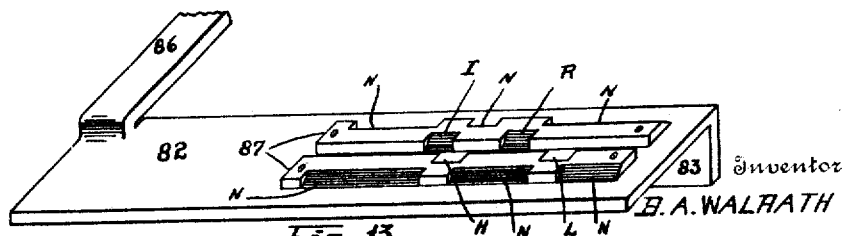

UNITED STATES PATENT OFFICE.

BURTON A. WALRATH, OF ROCK VALLEY, IOWA.

GEAR-SHIFTING MECHANISM.

1,239,435.  Specification of Letters Patent.  Patented Sept. 4, 1917.

Application filed March 13, 1914. Serial No. 824,456.

*To all whom it may concern:*

Be it known that I, BURTON A. WALRATH, a citizen of the United States, and a resident of Rock Valley, in the county of Sioux and State of Iowa, have invented certain new and useful Improvements in Gear-Shifting Mechanism, of which the following is a specification.

The present invention relates to means for controlling the transmission gearing of motor-driven vehicles.

My invention has for its primary object the production of improved means whereby the speed ratio is changed by operation of the clutch-controlling means.

Another object of the invention is the production of improved means whereby a gear may be selected while another gear is in operative relation with the main shaft and the former subsequently placed in operative position.

A further object of the invention is the construction of an improved purely mechanical device of this class.

A still further object is the production of transmission controlling mechanism wherein the number of moving parts and the cost of production are materially reduced and the efficiency is increased.

With these and several other objects in view, the invention, consisting in the construction, combination and novel arrangement of parts, will be fully understood from the following description, reference being had to the accompanying drawings, which form a part of this application and in which like characters of reference indicate corresponding parts throughout the several views, of which,—

Figure 1 is a fragmentary plan view of an automobile chassis equipped with mechanism constructed in accordance with my invention; Fig. 2 is a side elevation of the same; Fig. 3 is a plan view of the preferred form of selector-lever and quadrant; Fig. 4 is a vertical section taken on the line 4—4 of Fig. 3; Fig. 5 is an enlarged isometric perspective view of the preferred shifting mechanism, parts being cut away and the retracting spring being omitted; Fig. 6 is a front elevation of the same; Fig. 7 is an isometric perspective view of one of the cross members of the supporting frame and members associated therewith; Fig. 8 is a vertical section of the yoke locking mechanism; Fig. 9 is a side elevation of the cam-shaft swivel and cam-shaft, parts being cut away; Fig. 10 is a transverse section of the same taken on the line 10—10 of Fig. 9; Fig. 11 is a side elevation of the shifting mechanism; Fig. 12 is a plan view of the same, the yokes being taken in horizontal section on the line 12—12 of Fig. 11; and Fig. 13 is an enlarged isometric perspective view of the sliding lock-plate.

The embodiment selected for illustration is particularly adapted for use in connection with cars employing the sliding-gear type of transmission, yet I would not be understood as being limited to the specific structure or application illustrated, for various modifications and alterations in the details of construction and arrangement of parts may be made without departing from the spirit or scope of the invention as defined in the appended claims.

The invention contemplates, broadly, mechanism including members movable to place the transmission elements into and out of operative relation with the main shaft, means for operating said members, and means for selecting a transmission element to be subsequently placed in operation by operation of the clutch-controlling means, all of which will be presently made clear.

Referring now, particularly to Figs. 1 and 2, 14 represents the main frame of an automobile chassis carrying the usual foot-board, 15, and clutch-lever, 16, mounted upon the clutch-lever-shaft, 17, and retracted by the spring, 18. The steering-post is shown at 19 and the transmission case, at 20, is equipped with the customary gear-shifting rods, 21.

The structure above described represents no part of the present invention, but sets forth those parts of an automobile with which the device of my invention is associated.

The shifting mechanism is supported upon angle-iron cross-members, 22, extending transversely of the chassis, the end portions of said cross-members being upwardly inclined and bolted, as at 23, to opposite side members of the chassis. The intermediate portions of the said cross-members are interconnected by angle-iron bars, 24, which serve as the side supporting members of the mechanism.

A transverse shaft, 25, journaled for rotation and longitudinal movement within suitable bearings, 26, mounted upon the frame, carries at one end a fixed crank, 27, normally forwardly and downwardly inclined and connected by a rod, 28, with a crank-arm, 29, mounted upon the clutch-lever-shaft. The rear portion of the rod 28 is curved under the frame. The wrist of the crank-arm 29 operates within a longitudinal slot, 30, in the connecting-rod whereby the clutch-lever-shaft may be operated to perform its usual function prior to acting upon the shifting mechanism.

The length of the crank 27 should be such that the shaft 25 rocks a quarter turn during a full stroke of the clutch-lever.

The shaft is retracted and held yieldably in normal position by a retracting spring, 31, secured at opposite ends to the crank and frame.

A pin, or stud, 32, protruding from the collar of the crank, rests normally upon a bracket, 33, mounted on the frame and serves as a normal stop.

The opposite end of the shaft carries a swivel comprising a collar, 34, inclosing segments, 35, which freely engage an annular groove, 36, in the shaft. Oppositely-disposed studs, 37 and 38, are threaded through the collar and into the segments.

A horizontal plate, 39, is mounted upon the frame to move laterally to the shaft 25, said plate having a depending flange, 40, which slides adjacent the cross-member 24 and is supported thereupon by cap-screws, 41, inclosed by a longitudinal slot, 42, in the said flange.

The stud, 38, protrudes through a diagonal slot in the plate whereby movement of the latter imparts longitudinal movement to the shaft 25. The said slot preferably consists of a series of short slots, 43, disposed laterally to the shaft and alined diagonally thereto. Each slot communicates with its neighbor by a diagonal slot, 44.

To an upright bar, 45, carried on the forward end of the plate 39 is secured a connecting-rod, 46, the opposite end of which is pivotally-connected to an arm, 47, depending from and pivotally secured to a bracket, 48, mounted on the under side of the foot-board. The said connecting-rod is connected by a link, 49, with a crank, 50, carried upon the lower end of a rod, 51, mounted parallel to the steering-column and free to turn within a quadrant, 52, secured by straps, 53, or otherwise, upon the steering-post.

The upper end of the rod 51 is provided with a lever, 54, (Figs. 3 and 4) which is offset to pass the quadrant arc. The lever handle is provided with a longitudinal bore, 56, inclosing a pawl, 57, having a controlling knob, 58, protruding through a slot 59 in the handle. A compression-spring, 60, holds the pawl in yieldable engagement with the quadrant which is provided with V-shaped notches, R, N, L, I and H, which characters represent the respective speed ratios.

The selector-lever may be freely moved from point to point upon the quadrant, the pawl being self-acting. However, in order to obviate accidents from careless operation, means are provided whereby the lever cannot be moved to indicate reverse without first retracting the pawl by the controlling knob. This may be accomplished in any preferred manner, as by forming a tooth, 61, upon the quadrant, intermediate the neutral and reverse positions and adjacent the former.

From the structure now disclosed it is clear that movement of the selector-lever, from point to point upon the quadrant, will accordingly move the swivel-stud 38 from one to another of the slots 43 and thereby slide the shaft 25 longitudinally.

In the present embodiment, when the selector-plate 39 is moved forwardly to select reverse, the forward edge thereof will pass below the horizontal flange of the forward cross-member 22, and the upright 45 will be admitted in a transverse slot, 62, in the said flange. (Fig. 12.)

The advantage of the arrangement of the slots 43 and 44, previously set forth, resides in the fact that movement of the selector-plate has no effect upon the transverse shaft unless the stud 38 is engaged within one of the diagonal slots, as the slots 43 are somewhat longer than the diameter of the stud and are disposed longitudinally to the direction of travel of the plate. Were it not for this advantageous feature, great care in the installation would need be exercised in properly adjusting the parts which coact with the selector-lever in selecting a gear to be shifted.

The shaft 25 is armed with oblong cams, 63, 64 and 65, extending equal distances on opposite sides of the shaft. The cams are normally vertically disposed and have faces curved coaxially with the shaft. Intermediate the cams 63 and 64 is mounted a shifting cam, 66, having flat, oppositely disposed faces pitched at an angle of 45 degrees. The minor radius of this cam must be no greater than that of the other, or neutralizing cams, as will presently appear.

The cams 63, 64 and 65 act upon suitable movable members to shift the gears to neutral position; and the cam 66 coacts with said members to place the preselected gears in operative position.

These movable members, as preferably constructed, comprise companion yokes, 67 and 68, each formed integrally with forwardly and rearwardly extending arms, 69 and 70, respectively, free to slide within suitable bearings, 71, mounted upon the frame. The arms, 70, are connected by links, 72, with the gear-shifting-rods, 21.

Normally the yokes centrally inclose the cam-shaft, the inner faces of the upright members with which the cams coact being spaced from the cam-shaft distances equal to the radii of the neutralizing cams.

The yokes are each divided vertically and each member engaged by the cam, 66, is off-set with respect to its mate on the opposite side of the shaft, which permits engagement of one and passage of the other.

Referring, now, more particularly to Fig. 12, the yoke, 68 has rear uprights, or posts, 73 and 74, the former of which is directly opposite and connected with a forward post, 75, by upper and lower cross members, as 76; and the latter is connected with a diagonally opposite post, 77, by upper and lower cross-members 78. The post 75, it will be observed, is formed with an extended edge, 89, which addition makes the post relatively twice the width of the other uprights. The said extended portion is alined with the space intermediate the posts 73 and 74, and is the portion of the post, 75, which is engaged by the cam 64 to shift the yoke from reverse to neutral when low gear is chosen, as will presently appear. The intervening space between the posts 75 and 77 should be twice the space between the opposite uprights, the uprights being spaced by distances either equal to, or multiples of the distance the cam-shaft is moved by each step of the sliding plate 39.

The yoke 67 is oppositely disposed to its companion but may be identical therewith in design. In the embodiment illustrated, however, the spaces between the uprights of the yoke 67 are equal, the purpose of the additional space in the yoke 68 being to permit the shifting-cam 66 in neutral position to freely pass the outer and inner sides of the posts 74 and 77, respectively.

If the yokes were alike and the shifting-cam positioned in neutral between them, this would necessitate an undesirable arrangement of the indications upon the quadrant, inasmuch as neutral would fall between L and I.

When the selector lever is adjusted to indicate reverse, the shaft 25 is shifted longitudinally to such position that the shifting cam 66 is in alinement with the upright 74 of yoke 68. The neutralizing cam 63 is in alinement with both the upright 74 and the extended portion 75 of the yoke 67. The cam 63 is thus in position for engaging the one or the other of the above members in case the yoke 67 occupies an operative position.

When the clutch lever is actuated by the driver, the clutch is first disengaged, the pin-and-slot connection to the gear shifting mechanism permitting this operation without shifting the gear wheels of the transmission mechanism. Further actuation of the clutch lever causes a partial rotation of the shaft 25, and the neutralizing cam 63 effects the return of the yoke 67 to its neutral position, in case it had been previously shifted to one of its operative positions. The yoke 68 is then shifted by the cam 66 to the position corresponding to reverse operation of the transmission mechanism. When the clutch lever is released, the springs 18 and 31 return the lever and shaft 25 to their respective inoperative positions. When the selector lever is adjusted to indicate low gear, the shifting cam 66 is in alinement with the post 77 of the yoke 68 to shift the latter in the direction opposite to that above described. The neutralizing cam 63 is in alinement with the posts 73 and 75 of yoke 67 and the neutralizing cam 64 is in alinement with the post 74 of yoke 68. The actuation of the clutch pedal effects the change in speed ratio in the same manner as that described above.

To shift to intermediate and high gears, the cam shaft 25 is shifted to aline the shifting cam 66 with the posts 77 and 74, respectively, of the yoke 67. Under such conditions, the neutralizing cams 64 and 65 occupy positions for returning the yokes to neutral position, as will be readily understood.

To insure that the yokes are not moved untimely, locking mechanism is provided. The forward ends of the arms 69 are provided with threaded openings which receive screw-caps, 79, inclosing lock-bolts, 80. Compression-springs, 81, interposed between the closed ends of the caps and the bolts, hold the latter in yieldable engagement with a sliding lock-plate, 82, having a depending flange, 83, which slidably embraces the frame and is supported thereupon by cap-screws, 84, inclosed by a longitudinal slot, 85, in the flange. The plate has a rearwardly-extending arm, 86 off-set to pass the frame and has its terminal curved over the swivel of the cam-shaft and is provided with an opening, to receive the stud 37. By virtue of this arrangement the lock-plate travels in conjunction with the cam-shaft.

Upon the lock-plate are mounted parallel strips, 87, between which the bolts 80 are engaged when the yokes are in neutral position. The edges of the strips are provided with beveled notches of varying lengths and properly positioned, with respect to the positions assumed by the lock-plate, to permit the lock-bolts to pass over and engage the opposite edges of the strips when the yokes are shifted. The edges of the strips opposite each notch are left abrupt preventing retrograde movement of the yokes after shifting.

For example,—When the reverse gear is chosen, the notch R will register with the lock-bolt of yoke 68 and permit the former to pass over the strip when the yoke is shifted. In similar manner the notch L permits the yoke to be shifted oppositely. The notches I and H accommodate the corresponding movements of the companion yoke. The beveled portions N permit the yokes to be shifted to neutral.

Although the structure set forth is applicable to only a four-speed transmission, clearly any number of speeds may be controlled by changing the number of parts already described.

In instances where the transmission case is located in the forward portion of the car, the connections therewith may be made upon the forward arms of the yoke or at any other suitable points.

Having thus described my invention, what I claim as new and desire to secure by Letters Patent of the United States, is,—

1. A device of the class described comprising in combination with clutch-controlling means and gear-shifting members, each movable in opposite directions between two positions, and between either of said positions and an intermediate position, elements movable to positions corresponding to the positions of the gear-shifting members to operate the said members, a shaft adapted to be turned by the clutch-controlling means, cams of varying radii carried by said shaft and operable by turning of the shaft in one direction to move any one of said elements to its intermediate position and a chosen one of said elements to a chosen one of said first positions.

2. A device of the class described comprising in combination with the clutch-lever and gear-shifting members, each movable in opposite directions between two positions, and between either of said positions and an intermediate position, elements movable to positions corresponding to the positions of the gear-shifting members to operate said members, a cam-shaft turned by the clutch-lever, and operable when turned in one direction to first move any one of said elements to its intermediate position and then move any chosen one of said elements to a chosen one of said first positions.

3. In a device of the class described the combination with the clutch-lever and gear-shifting members, each movable in opposite directions between two positions, and between either of said positions and an intermediate position, of a suitable frame, cams of varying radii carried by the frame, means controlled by the clutch-lever for turning the cams, and elements connected with the gear-shifting members and slidably carried by the frame to move to positions corresponding to the positions of said members, said elements each having cam-engageable posts disposed on opposite sides of the cams, said posts being engageable by certain of the cams to move the element to its intermediate position, and certain of said posts being engageable by certain of the cams to move the element to any chosen one of said first positions.

4. In a device of the class described the combination with the clutch-lever and gear-shifting members, each movable in opposite directions between two positions, and between either of said positions and an intermediate position, of a suitable frame, cams of varying radii carried by the frame, means controlled by the clutch-lever for turning the cams, elements connected with the gear-shifting members and slidably carried by the frame to move the positions corresponding to the positions of said members, said elements each having cam-engageable posts disposed on opposite sides of the cams, said posts being engageable by certain of the cams to move the element to its intermediate position, and certain of said posts being engageable by certain of the cams to move the element to any chosen one of said first positions, and means for placing any chosen ones of the latter cams and posts in operative relation with each other.

5. A device of the class described comprising in combination with clutch-controlling means and gear-shifting elements, a cam-armed rock-shaft actuated by the clutch-controlling means and movable longitudinally, members controlled by said rock-shaft for operating said gear-shifting elements, a plate movable laterally to the rock-shaft and having an elongated slot disposed diagonally to the rock-shaft, a swivel mounted upon the rock-shaft and having a part engaged within said slot, and means for moving said plate.

6. A device of the class described comprising in combination with clutch-controlling means and gear-shifting elements each movable in opposite directions, a cam-armed rock-shaft actuated by the clutch-controlling means and movable longitudinally, members controlled by said rock-shaft for operating said elements, a plate movable laterally to the rock-shaft and having an elongated slot disposed diagonally to the rock-shaft, a swivel mounted upon the rock-shaft and having a part engaged within said slot, means for moving said plate, and means for locking said members.

7. A device of the class described comprising in combination with clutch-controlling means and gear-shifting elements, a cam-armed rock-shaft actuated by the clutch-controlling means and movable longitudinally, members controlled by said rock-shaft for operating said elements, a plate movable laterally to the rock-shaft and having an elongated slot disposed diagonally to the rock-shaft, a swivel mounted upon the rock-shaft and having a part engaged by said slot, and means for moving said plate including a lever-controlled oscillating arm, and a pivotal connection between said plate and arm.

8. In a device of the class described the combination with clutch-controlling means and gear-shifting elements each movable in opposite directions between one point and points on opposite sides of said point, of mechanism including a supporting frame, a shaft mounted for rotation and longitudinal movement thereon; means governed by the clutch-controlling means for rocking said shaft, cams of varying radii mounted upon said shaft, shifting members movable laterally to said shaft, connected with the gear-shifting elements and including mated parts disposed perpendicularly to and normally centrally inclosing said shaft, each of said parts being spaced from its mate relatively twice the radii of the smaller of said cams and certain of said parts being off-set with respect to their mates whereby the greater of said cams may engage one and pass the other of said certain parts in moving the elements selected, a speed-indicating lever controlled by the driver, and means governed by the lever for moving said shaft longitudinally to place the cams in operative alinement with determinate ones of said parts.

9. In a device of the class described the combination with clutch-controlling means and gear-shifting members each movable in opposite directions between one point and points on opposite sides of said point, of mechanism including a supporting frame, a shaft mounted for rotation and longitudinal movement thereon, means governed by the clutch-controlling means for rocking said shaft, cams of varying radii mounted upon said shaft, shifting members movable laterally to the shaft, connected with the gear-shifting elements and including mated parts disposed perpendicularly to and normally centrally inclosing said shaft, each of said parts being spaced from its mate relatively twice the radii of the smaller of said cams and certain of said parts being off-set with respect to their mates, whereby the greater of said cams may engage one and pass the other of said certain parts in moving the element selected, a plate mounted upon the frame to move laterally to the shaft and provided with a series of slots alined diagonally to the shaft, each of said slots being disposed at right-angles to the shaft and each communicating with its neighbor by a diagonal slot, a swivel mounted upon the shaft and having a part engaged by said slots, a speed indicating and selecting lever mounted upon the steering column, and means controlled by said lever for moving said plate.

10. In a device of the class described the combination with clutch-controlling means and gear-shifting elements each movable in opposite directions between one point and points on opposite sides of said point, of mechanism including a supporting frame, a shaft mounted for rotation and longitudinal movement thereon, means governed by the clutch-controlling means for rocking said shaft, cams of varying radii mounted upon said shaft, shifting members movable laterally to said shaft, connected with the gear-shifting elements and including mated parts disposed perpendicularly to and normally centrally inclosing said shaft, each of said parts being spaced from its mate relatively twice the radii of the smaller of said cams and certain of said parts being off-set with respect to their mates whereby the greater of said cams may engage one and pass the other of said certain parts in moving the member selected, a plate mounted upon the frame to move laterally to the shaft and provided with a series of slots alined at an angle to said shaft, each of said slots being disposed at right-angles to the shaft and each communicating with its neighbor by a diagonal slot, a swivel mounted upon the shaft and having a part engaged by said slots, a speed-indicating and selecting lever mounted upon the steering column, means controlled by said lever for moving said plate, and locking mechanism including yieldable bolts carried by said shifting members and a part movable by longitudinal movement of, and in parallelism with said shaft and having parallel, elongated and relatively raised and depressed portions to slidably engage said bolts, said portions having transverse notches arranged at suitable intervals, respecting the position of the cams, to permit the operation of said shifting members.

11. In gear-shifting mechanism for motor-vehicles, the combination with transmission mechanism including a plurality of power-transmission gears, each movable between neutral and operative positions, and gear-shifting elements for said gears, of members movable to positions corresponding to said neutral and operative positions for the control of said elements, turning mechanism engageable with any selected one of said members, and serving by movement in one direction, to move said selected member to neutral position and to subsequently move any selected one of said members to an operative position, means for placing the turning mechanism in engagement with any selected one of said members, and means for actuating the turning mechanism.

12. In gear-shifting mechanism for motor-vehicles, the combination with transmission mechanism including power-transmission gears, each movable between neutral and operative positions, and gear-shifting elements for said gears, of members movable to positions corresponding to said neutral and operative positions for the control of said elements, turning mechanism engageable with any selected one of said members, and adapted by a single rotative movement to move said selected member to neutral position and to subsequently move any selected one of said members to an operative position, means for placing said turning mechanism in engagement with any selected one of said members, and means for actuating the turning mechanism.

13. In gear-shifting mechanism for motor-vehicles, the combination with the clutch-pedal and transmission mechanism including power-transmission gears, each movable between neutral and operative positions, and gear-shifting elements for said gears, of members movable to positions corresponding to said neutral and operative positions for the control of said elements, turning mechanism controlled by the clutch-pedal and engageable with any selected one of said members and operable, during movement of the clutch-pedal in one direction, to move any selected one of said members to neutral position and to subsequently move any selected one of said members to an operative position, and means for placing the turning mechanism in engagement with any selected one of said members.

14. In gear-shifting mechanism for motor-vehicles, the combination with the clutch-pedal, and transmission mechanism including power-transmission gears, each movable between neutral and operative positions, and gear-shifting elements for the gears, of members movable to positions corresponding to said neutral and operative positions for the control of said elements, turning mechanism engageable with any selected one of said members and turning in one direction to move said selected member to neutral position and to subsequently move any selected one of said members to an operative position, means controlled by the clutch-pedal for actuating said turning mechanism, and means for placing said turning mechanism in engagement with any selected one of said members.

15. In gear-shifting mechanism for motor-vehicles, the combination with transmission mechanism including power-transmission gears, each movable to neutral and operative positions, and gear-shifting elements for said gears, of members movable to positions corresponding to said neutral and operative positions for the control of said elements, turning mechanism adapted by a single rotative movement to move any selected one of said members to neutral position and to subsequently move any selected one of said members to an operative position, means for actuating the turning mechanism, and means for selecting the member to be moved.

16. In gear-shifting mechanism for motor-vehicles, the combination with transmission mechanism including power-transmission gears each movable between neutral and operative positions, and gear-shifting elements for said gears, of members movable to positions corresponding to said neutral and operative positions for the control of said elements, turning mechanism operable in one direction to move any selected one of said members to neutral position and to subsequently move any selected one of said members to an operative position, means for actuating the turning mechanism, and means for selecting the member to be moved.

17. In a gear-shifting mechanism, the combination with a plurality of shiftable transmission elements, of means for selectively controlling said elements, said means comprising a shaft that is longitudinally adjustable to select the element to be shifted and is rotatable to shift said element, and means for actuating said shaft.

18. In a gear-shifting mechanism, the combination with a plurality of shiftable members, of means for selectively shifting said members from a neutral position, said means comprising a shaft that is longitudinally adjustable to select the member to be shifted and is rotatable to effect the return of a shifted member to its neutral position and the shifting of a second member to an operative position.

19. In a gear-shifting mechanism, the combination with a plurality of shiftable members, of means for selectively shifting said members from a neutral position, said means comprising a shaft that is longitudinally adjustable to select the member to be shifted and is rotatable to effect the return of a shifted member to its neutral position and the shifting of a second member to an operative position by a continuous movement, and means for actuating said shaft.

20. In a gear-shifting mechanism, the combination with a plurality of shiftable transmission elements, of means for selectively controlling said elements, said means comprising a shaft that is longitudinally adjustable to select the element to be shifted and is rotatable to shift said element, indicating means for actuating said shaft longitudinally, and means comprising a clutch-pedal lever for rotating said shaft.

In testimony whereof I have hereunto set my hand in presence of two subscribing witnesses.

BURTON A. WALRATH.

Witnesses:
  MILTON S. CRANDALL,
  HELEN GARLOCK.